Aug. 12, 1947.  J. YOUNG  2,425,450
FLUID-PRESSURE APPARATUS FOR FABRICATING LAMINATED ASSEMBLIES
Filed March 29, 1944  2 Sheets-Sheet 1
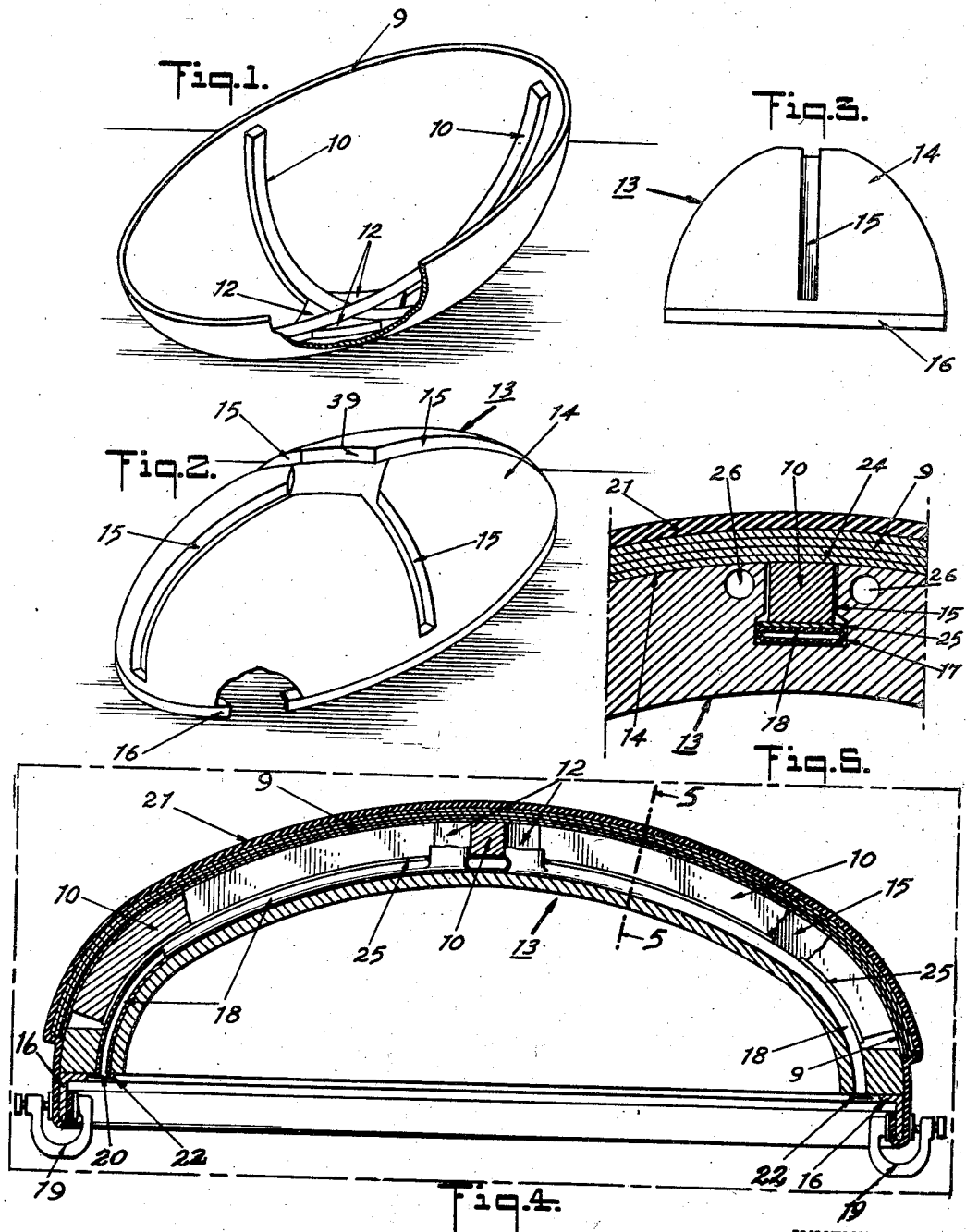
INVENTOR.
JOHN YOUNG
BY
ATTY.

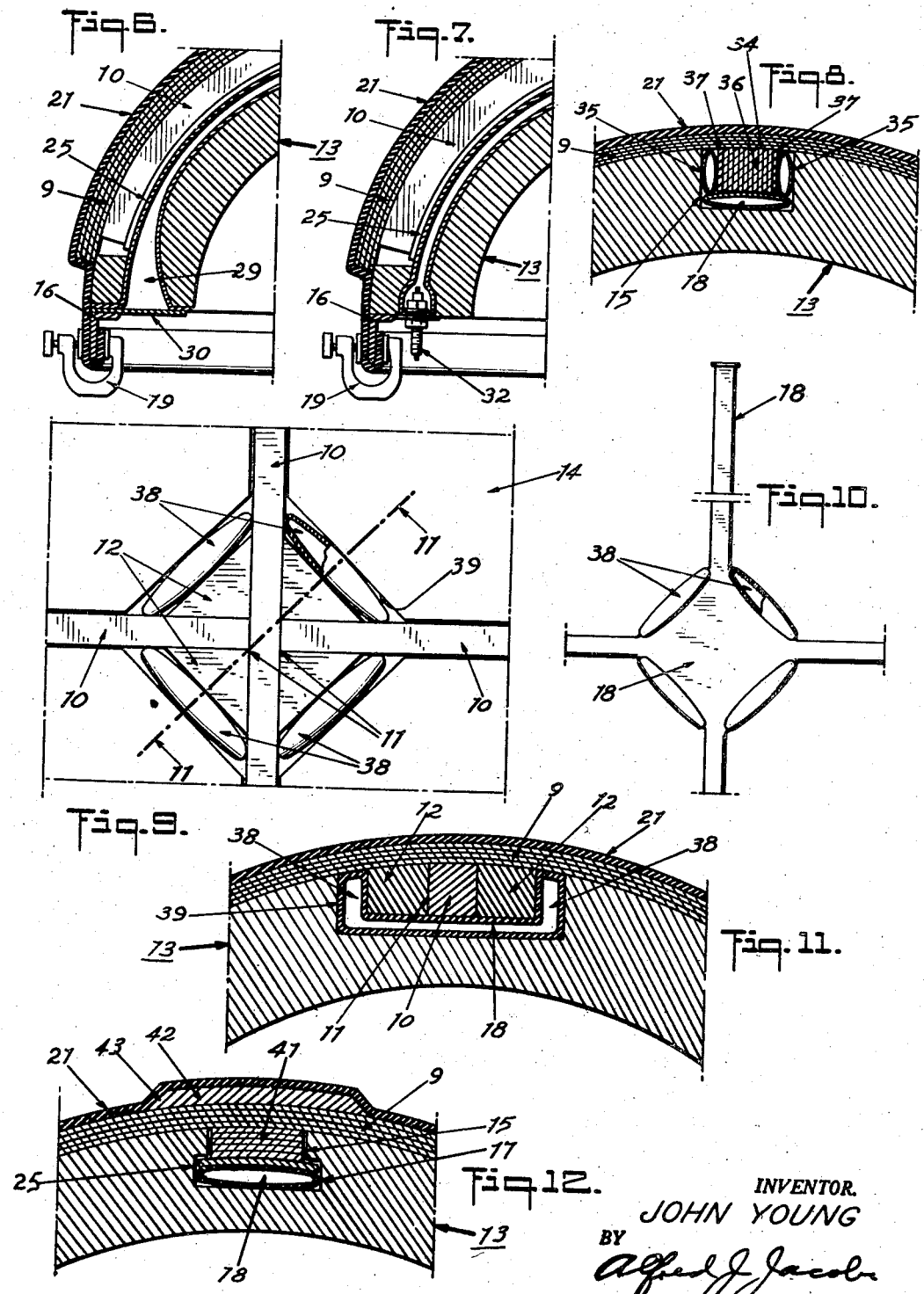

Patented Aug. 12, 1947

2,425,450

UNITED STATES PATENT OFFICE 2,425,450

FLUID-PRESSURE APPARATUS FOR FABRICATING LAMINATED ASSEMBLIES

John Young, Hagerstown, Md., assignor to Duramold Aircraft Corporation, New York, N. Y., a corporation of Delaware Application March 29, 1944, Serial No. 528,604

7 Claims. (Cl. 144—281)

This invention pertains to the art of molding wood or the like material. More particularly, the invention pertains to the art of forming molded structures, which are usually comparatively thin and which are backed by reinforcing members to add strength and stiffness to the assembly.

The invention comprises apparatus for, and the method of, integral molding, which comprises fabricating a molded structure, and simultaneously adhering to the structure one or more reinforcing members in backing relationship therewith.

Under prior art practice, thin structures are molded against a rigid die surface, under pressure applied to and through the material of the structure, directed to the rigid surface. For example, a plurality of plies of wood veneers are laid up superimposed on the die surface, and are adhered together while being pressed into conformity with the contour of the die surface. The pressure medium, according to prior art practice, is usually a pressure fluid, steam being commonly used because it supplies heat which also operates to cure the adhesive. A flexible cover, usually comprising a blanket or bag of rubber, is interposed between the layup and the pressure fluid, to act as a membrane for transmitting the pressure to the material of the assembly, and also to protect the adhesive from attack by the steam.

It is common practice, and usually necessary, that thin molded structures be reinforced by backing members to add stiffness to the part, and to resist its collapse in use. For example, in the case of skins and shells to be employed as aircraft parts, such as fuselages, stabilizers, fins, etc., the skins are backed by ribs, bulkheads and the like. Such reinforcing members are usually adhered to the concave surface of the skin. The preferred prior art practice is to reinforce skins in a secondary assembly operation, but this practice is costly and time-consuming.

It has been proposed to mold skins on a male, or convex die, which permits the die to be slotted to receive ribs, bulkheads, and the like reinforcing members. The layup of the skin is then positioned against the die surface and over the reinforcing member in position to be molded and adhered to the reinforcing member simultaneously. There are a number of disadvantages in this practice, which the present invention effectively overcomes.

Because of the cellular structure of wood being heterogeneous and because of its hygroscopic properties, it is not practicably possible to machine reinforcing members to fit so accurately in slots of convex dies as to adhere them to skins in an integral molding operation without distorting the skin. Continuity of the molding surface of the die is broken by the slot which receives the reinforcing member, and the surface of the reinforcing member which is adhered to the skin lies either above or below the contour of the die surface continued in the area of the slot. When the reinforcing member projects too high above the surface of the die, the skin is arched over the edge thereof, and this produces a permanent distorting bulge in the skin. When the rinforcing member underlies the surface of the die, the skin is depressed into the slot to engage the reinforcing member, and this produces a distorting depression in the skin.

The present invention comprises a method of integrally molding a skin or the like thin structure, and simultaneously to back it with one or more ribs, bulkheads, or the like reinforcing members. The invention contemplates use of a die slotted to receive a reinforcing member to be adhered to the skin simultaneously with the skin being molded. Distortion of the skin is avoided by applying pressure to the reinforcing member directed therethrough and through its surface of contact with the skin, this pressure being opposed to the skin molding pressure.

The invention is applicable to dies of either the convex or the concave type, but finds application most frequently in convex dies, because a reinforcing member for a skin is usually attached to the concave surface thereof.

Any suitable means may be provided for exerting pressure on the reinforcing member opposed to the skin molding pressure. One means found suitable is a membrane positioned in the slot and backed by fluid under pressure, this pressure acting through the membrane to press the reinforcing member against the skin. Under preferred practice, the pressure exerted by the membrane is equal to the molding pressure, so that there is no differential of pressure either in one direction to distort the skin with a permanent depression, or in the other direction to cause bulging distortion of the skin. Under preferred practice, the medium for applying pressure to adhere the reinforcing member to the skin is the same pressure fluid that applies the molding pressure, and, therefore, equal and opposite pressures are automatically applied to the material of the assembly.

In the shown embodiment of the invention, the membrane for applying pressure to the reinforcing member comprises a tube positioned to rest on the bottom of the slot in backing relationship with the reinforcing member. The tube extends beyond the ends of the reinforcing member to the surface of the die where it communicates with the atmosphere surrounding the die. By this means, the fluid pressure of the atmosphere external of the die which operates to mold the skin, is also disposed interior of the tube, so that the pressure which operates to adhere the reinforcing member to the skin is equal and opposite to the molding pressure.

A given lot of reinforcing members for different assemblies may present slight dimensional differences due either to imperfect machining, or to changes in moisture content of the pieces incident to their hygroscopic properties. Because of the heterogeneous cellular structure of wood, changes in moisture content will produce different degrees of dimension change within a piece at different places, and in different pieces of a lot of like pieces. Such considerations do not detract from satisfactory assemblies being fabricated in production lots, because the membrane, and the pressure fluid backing the membrane, yields to the reinforcing member to whatever degree is determined by its particular dimensions. The actuating pressure which adheres the reinforcing member to the skin in different assemblies is the same, it being the pressure of the fluid.

The present invention permits parts to be machined to less precise limits, and at much lower cost. Furthermore, lack of homogeneity in the material employed, being a factor beyond human control, is not a factor causing the fabrication of defective assemblies, and does not prevent the uniform construction of different like assemblies. Complex and expensive conditioning apparatus employed in the prior art to maintain parts to exact dimensional limitations are eliminated and unnecessary in the satisfactory practices of the present invention. Furthermore, better assemblies are produced more quickly and at less cost, and less skill is required to produce satisfactory assemblies.

The nature of the invention will be better understood and appreciated by reference to the accompanying drawing to which attention is now directed.

In the drawings—

Figure 1 presents a view in perspective of an illustrative form of assembly, which can be produced under practice of the present invention, Figure 2 presents a perspective view of a die, or mandrel, suitable for the practice of the invention, Figure 3 presents an end elevation of the mandrel of Figure 2, Figure 4 presents a longitudinal cross-sectional elevation of the die of Figure 2, Figure 5 presents a fragmentary cross-sectional elevation, taken on line 5—5 of Figure 4, Figure 6 presents a fragmentary cross-section similar to Figure 4, illustrating a modified form of the mandrel structure of the invention, Figure 7 presents a fragmentary cross-section, similar to Figure 6, illustrating another modified form of the mandrel structure of the invention, Figure 8 presents a fragmentary cross-section, similar to Figure 5, illustrating a modified form of the invention, which embodies fabrication of a more complex assembly, Figure 9 presents a fragmentary plan view of the die containing the reinforcing members, Figure 10 is a detail, showing the member for exerting pressure on the reinforcing member to adhere it to the skin, Figure 11 is a fragmentary cross-sectional view, taken on line 11—11 of Figure 9, and Figure 12 is a fragmentary cross-sectional view, similar to Figure 5, illustrating another assembly capable of being fabricated by the practice of the invention.

Referring to the drawings, Figure 1 illustrates one embodiment of a structural assembly capable of being fabricated by the practice of the present invention. The particular form of the structure of Figure 1 is illustrative, and does not constitute a limitation of the scope of the invention. The shown embodiment illustrates application of the invention to the production of a structure comprising compound curvature. It will be obvious to persons skilled in the art that the invention applies also to the fabrication of flat structures, and structures with single direction curvature.

The structure of Figure 1 presents a thin, weblike member 9, which may constitute a skin or shell of, for example, an aircraft part. The skin, or shell, 9 may comprise any suitable fabricated structure, laid up in any suitable manner. The particular structure of the shell 9 forms no part of the present invention, and therefore, is not shown in detail. However, the skin 9 is adapted to be molded in the practice of the present invention. Accordingly, it may comprise a plurality of pieces, veneers, laminae, or plies, which are formed to the predetermined desired contour as shown, the several pieces being maintained under the molding pressure while they are being adhered together, to complete their fabrication to the shown contour.

The skin 9 is backed by the reinforcing member, in the instant case comprising ribs 10 of any suitable construction and any suitable cross section. In the structure shown, the reinforcing member operates to reinforce the shell in two directions of curvature, and, therefore, the ribs 10 meet at 11 in the manner shown, the intersection 11 being reinforced by the corner blocks, or gussets, 12.

In the practice of the present invention, to fabricate the shown assembly, the skin 9 is molded to the desired contour, and simultaneously the reinforcing member comprising the ribs 10 and corner blocks 12 are adhered to the skin 9 as a single integral molding operation. The ribs 10 and corner blocks 12 are simultaneously adhered together in desired relative positions shown, so that in the completed assembly the skin 9 is backed by a reinforcing member which comprises a fabricated supporting structure.

The die, or mandrel, referred to generally as 13, and illustrated in Figure 2, is suitable for fabricating the assembly of Figure 1. The die, or mandrel, 13 can be of any suitable material and construction. The embodiment shown comprises the rigid forming surface 14, of a contour companion to the desired contour of the shell 9. Continuity of the surface 14 is interrupted by the grooves 15, the grooves being of size and shape to accommodate the reinforcing members 10 and the corner blocks 12 embedded in the die below the forming surface 14, the grooves being so positioned in the die as to locate the reinforcing member in desired position with reference to the skin 9.

The grooves 15 are slightly wider than the reinforcing members 10, to allow freedom of motion of the reinforcing members into firm bonding engagement with the skin 9. The side walls of the grooves 15 support the reinforcing members 10 located in desired position backing the skin 9. Beyond the area of the forming surface 14, and describing the periphery of the die, is the blanket holding rim 16, which, in the disclosed embodiment, comprises an angle member. See also Figure 4.

A membrane disposed in the bottom of each groove 15 is located for the reinforcing member to rest thereon when it is positioned in the groove. The membrane is backed by pressure fluid, which exerts pressure on the reinforcing member directed towards the skin 9. In the preferred embodiment shown, the membrane comprises a fluid pressure chamber 18, which is inflatable by pressure fluid contained therein.

As illustrated in Figure 5, the grooves 15 are preferably undercut at their bottoms as at 17, the chamber 18 being wide enough to span the wider space in the base of the groove 15 afforded by the undercut portions 17. The purpose of the widened bottom of the groove 15 is to extend the rounded edge portions of the chamber 18 beyond the side edges of the reinforcing member 10. The thickness of the chamber 18 in flattened condition, and of the reinforcing member 10, is such, relative to the depth of the groove, that the base of the reinforcing member is actuated by the flat portion only of the chamber 18 when it is inflated.

In the embodiment shown the pressure chamber 18 constitutes a flexible tube of rubber, metal, or other suitable material, and the tube is extended throughout the area where pressure is to be applied. As illustrated in Figure 4, the tube 18 extends throughout the length of the reinforcing member 10, and it extends beyond the ends thereof to the outside surface of the die 13, where it terminates with the passages 20 which communicate with the atmosphere surrounding the die. The tube ends 20 are sealed into engagement with the die at 22 to prevent pressure fluid from entering the grooves 15 outside the surface of the tube 18. Thus the pressure fluid is sealed against contact with the reinforcing member 10 and the bonding material employed for adhering the reinforcing member 10 to the skin 9. The seal at 22 also prevents pressure fluid from exerting a pressure on the outside of the tube 18 opposed to the pressure internally of the tube, a condition which would defeat the purpose of the invention.

Molding of the skin 9 can be accomplished in any suitable manner. For example, this may be accomplished in the manner disclosed in the patent to Potchen et al., No. 2,308,453, of January 12, 1943. Pursuant to this practice the cover 21, comprising a blanket of rubber or similar suitable material, is provided to enclose the layup of the skin 9 against the die surface 14, the edges of the blanket being clamped to seal the blanket edge to the die. Any suitable clamping means can be provided, such as the C clamps 23, which seal the edge of the blanket to the sealing rim 16.

The package, prepared in the manner described, is subjected to fluid pressure, usually accompanied with the application of heat. It will be understood by persons skilled in the art that a suitable adhesive is applied to all surfaces of contact between the several pieces comprising the assembly to be fabricated. A suitable adhesive is applied to the several pieces comprising the skin 9. Likewise adhesive is applied to the reinforcing members along the surfaces of contact with the skin 24, and the several corner blocks 12 have had adhesive applied to them along surfaces which contact the skin 9 as well as surfaces that contact the rib 10 at the junction points 11. This is well understood in the art and requires no further disclosure herein except to note that the preferred modern practice is to use a thermo-setting adhesive. Thus when the package is placed in steam chambers, in the manner disclosed in the referred to patent, No. 2,308,453, the heat of the steam operates to cure the adhesive and the pressure of the steam supplies the required pressure.

It will be noted that the steam pressure is thus applied to the layup of the skin 9, through the blanket 21. Accordingly, the layup is pressed against the die surface 14, to form it to the contour predetermined by the die surface contour. Simultaneously steam under pressure enters through the ends 20 of the tube 18, which is thus inflated, and which operates to press the reinforcing members 10, including the corner blocks 12, into adhering contact with the under surface of the skin 9, along the surfaces of contact 24, Figure 5.

If desired, pressure transmitting and distributing strips 25 can be interposed between the pressure chamber 18 and the ribs 10 of Figure 5, to distribute the pressure applied to the reinforcing member uniformly throughout their widths, and to provide a uniform operating pressure throughout the area of contact 24 between the ply structure 9 and the ribs 10. The strips 25 may comprise metal, wood or plywood, or any other suitable material affording flexibility longitudinally, with sufficient transverse rigidity to prevent the tubing 18 from becoming rounded under fluid pressure in the areas of engagement with the ribs 10.

It will be noted that there will be a predetermined molding pressure applied to the layup of skin 9, and that this pressure will be directed against the surface 14 of the die. This pressure will also be directed against the surface of contact 24 between the skin 9 and reinforcing member 10, and simultaneously an equal and opposite pressure is applied to the surface 24 by the pressure chamber 18 acting through the reinforcing member 10. Accordingly, the material comprising the skin 9 will be formed to the contour determined by the die surface 14, and simultaneously in the same operation the reinforcing members 10 will be adhered to the skin 9. If the ply structure comprises a plurality of pieces, or a plurality of superimposed plies of wood veneer, the pieces or plies will be adhered together simultaneously, and as part of the integral molding operation described.

Under certain circumstances, especially when the die 13 is massive and of a material which conducts heat poorly, it becomes desirable to provide for the application of heat more directly to the area of contact 24 between the ply structure 9 and the reinforcing member 10. Any suitable heating means may be employed. For example, and as illustrated in Figure 5, such means for applying heat locally to the glue line 24 may comprise ducts 26, located proximate to glue line, which ducts contain steam when the process of the patent, No. 2,308,453, is employed.

A modified means for applying pressure to the chamber 18 is illustrated in Figure 6. In this modification, the ends of the tube are flared as at 29 to provide increased areas, and the ends are closed and sealed by flexible diaphragms shown diagrammatically at 30, of rubber or similar material. By means of this construction the steam pressure is applied to the outside of the diaphragm 30, which in turn is deflected thereby compressing the air within the tube 18, the pressure within the tube being transmitted to the reinforcing member 10 in the manner previously described.

It is sometimes desirable to apply pressure to the chamber 18 independently of the pressure applied to the layup 9 through the cover 21. To provide for this possibility, as illustrated in Figure 7, the valve 32 is attached to the end of the tube 18, to enable the supply of pressure fluid to the tube from any suitable source. With this arrangement the pressure fluid can be the same as that applied to the blanket 21, or pressure fluid may be from any suitable different source. The magnitude of the pressure applied to the tube 18 can be controlled more accurately with reference to the magnitude of the molding pressure applied to the blanket 21.

The reinforcing members 10 may comprise rigid pieces, machined to the desired dimensions, and along the surface 24 machined to a contour to fit in contacting engagement with the skin 9. The member 10 may be solid, or it may be made of a plurality of pieces adhered together, or otherwise attached to each other, to comprise the reinforcing member.

For example, and as illustrated in Figure 8, the reinforcing member may comprise a plurality of plies or laminae 36, disposed side by side as shown. Under the practice as illustrated in Figure 8, the several laminae 36 are adhered together to comprise the reinforcing member assembly, simultaneously with the skin 9 being molded, and the reinforcing member being adhered to the skin 9. The pressure chambers 35, Figure 8, are provided on each side face of the several laminae 36, the pressure chambers 35 comprising tubes which communicate either with the tubing 18 and through the tubing 18 with the atmosphere outside the die 13, or directly with the atmosphere outside the die by sealed terminal outlets similar to the outlet 20 of the tube 18. If desired, pressure transmitting and distributing members 37 can be positioned on opposite sides of the several laminae 36, interposed between the pressure chambers 35 and the proximate laminae 36, the members 37 functioning in a manner similar to the pressure transmitting members 25, of Figure 5, and for a similar purpose.

In the case of several laminae 36 being adhered together to comprise the reinforcing member, it is preferable not to interpose a pressure transmitting member between the tube 18 and the laminae 36. Instead the tube 18 is positioned to engage the reinforcing member directly, in the manner shown in Figure 8. By this means the pressure is applied individually to the several laminae 36, to press them independently into engagement with the skin 9. The several laminae 36 are pressed against the skin 9 with like pressures along composite surface of contact 34.

A suitable structure is provided for adhering the corner blocks 12 into engagement with the reinforcing members 10 at the junctures 11. See Figures 9 to 11. The corner blocks 12 are backed by the tube 18 expanded to cover the area opposite the blocks 12 and the junction 11 of the reinforcing ribs 10. The chamber 18 is also extended at 38, to lie in backing relationship to the blocks 12, and between the blocks 12 and the surface 39 of the dies 13. Thus the pressure of the extensions 38 is operable to press the blocks 12 against the ribs 10 at the intersections 11, and the expanded portions of the tube 18 below the blocks 12 operate to press the blocks 12, together with the ribs 10 at their intersections 11, into engagement with the under surface of the skin 9, the pressure at all points being equal, and directed to surfaces of contact between pieces being adhered together.

It is more desirable, under some circumstances, to mold the reinforcing members into conformity with the contour of the skin. Under this practice the reinforcing member may comprise a plurality of laminae 41, Figure 12, the additive thickness of which comprises the desired depth of the reinforcing member. The laminae 41 may be adhered together simultaneously with the reinforcing member being adhered to the skin 9, and simultaneously with the skin 9 being molded against the die surface 14. Suitable means for accomplishing the purpose comprise the slot 15 which accommodates the laminae 41 of the reinforcing member. The laminae 41 are pressed together, and against the skin 9, under action of the pressure chamber 18. Pressure transmitting and distributing strip 25 is preferably interposed between the laminae 41 and the chamber 18.

The conditions of pressure application may be such that the molding pressure applied to the skin 9, through the blanket 21, is greater than the pressure exerted by the tube 18 to and through the reinforcing member against the under surface of the skin 9. Such a differential of pressure may be created deliberately, for example, by means of the embodiment of Figure 7. The effective pressure acting to press the reinforcing member against the undersurface of the skin 9 may be reduced below the magnitude of the opposed molding pressure incident to conditions of the layup, for example. For example, and as disclosed in the embodiment of Figure 12, the edges of some or all of the laminae of reinforcing member 41, or glue extruded from between laminae, may engage the walls of the groove 15, setting up resistance against the pressure exerted by the tube 18.

In the event of a condition in which the molding pressure is greater than the effective pressure exerted against the undersurface of the skin 9 by the tube 18, the molding pressure tends to depress the skin 9 into the groove 15, and to mold it with permanent deformation. The bridge strip 42 can be employed to prevent the skin 9 being molded with the described deformations.

The bridge strip 42, Figure 12, is interposed between the layup of the skin 9 and the blanket 21, located opposite the groove 15. The bridge strip 42 is somewhat wider than the groove 15, and is positioned to span the groove. It is preferably bevelled along its edges, as shown at 43, so that the blanket 21 conforms smoothly with the contour of the strip 42 and the surface of the skin 9.

In the arrangement as shown in Figure 12, the pressure of the tube 18 can be considerably lower than the molding pressure, so long as it is great enough to produce firm bonding between the reinforcing member and the skin 9, and between the laminae 41 of the reinforcing member in the case of a molded reinforcing member being fabricated.

A number of modifications within the scope of the present invention will be obvious to persons skilled in the art. It is to be understood that the embodiments described and shown in the accompanying drawings do not constitute limitations of the scope of the invention. The scope of the invention is determined by the accompanying claims.

I claim:

1. A device for fabricating an assembly of molded wood and the like material, comprising, a rigid die having a forming surface and a groove interrupting the continuity of the forming surface, the groove being adapted to contain material to be adhered to structure molded on the forming surface; a pressure fluid responsive member at the bottom of said groove, said member having a movable wall for engaging the material contained in the groove and to exert pressure directed to and through the material against the structure molded on the forming surface; means for urging said structure against said forming surface; and means for applying fluid under pressure to said member.

2. A device for fabricating an assembly of molded wood or the like material, comprising, a rigid die having a forming surface and a groove interrupting the continuity of the forming surface, the groove being adapted to contain material to be adhered to the structure molded on the forming surface; an inflatable tube in the base of the groove for engaging the material contained therein and to exert pressure directed to and through the material against structure molded on the forming surface, the tube communicating with the space surrounding the die, and means for urging said structure against said forming surface.

3. A device for fabricating an assembly of molded wood and the like material, the die having a rigid forming surface and a groove interrupting the continuity of the forming surface, the groove being adapted to contain material to be adhered to structure molded on the forming surface; expansible means at the bottom of the groove for engaging material contained therein and for exerting pressure directed to and through said material against the structure molded on the forming surface, and means for urging said structure against said forming surface.

4. A device for fabricating an assembly of molded wood and the like material, the die having a rigid forming surface and a groove interrupting the continuity of the forming surface, the groove being adapted to contain material to be adhered to structure molded on the forming surface; expansible means extending along the sides and the bottom of the groove for compressing the material contained therein and for exerting pressure directed to and through the material against the structure molded on the forming surface, and means for urging said structure against said forming surface.

5. A device for fabricating an assembly of molded wood and the like material, the die having a rigid forming surface and a groove interrupting the continuity of the forming surface, the groove being adapted to contain material to be adhered to structure molded on the forming surface, a pressure fluid responsive member at the bottom of the groove, said member having a movable wall positioned to engage material contained therein and to exert pressure directed to and through the material against the structure molded on the forming surface, means for applying heat along the edge of the groove, and means for urging said structure against said forming surface.

6. A device for fabricating an assembly of molded wood or the like material, comprising a rigid forming surface, pressure fluid operated means for molding a skin to the forming surface, the continuity of the forming surface being interrupted by a groove adapted to contain material to be adhered to the skin; pressure fluid operated means at the bottom of the groove for urging the material therein against the skin in opposition to the molding pressure on the skin, and pressure distributing means between said first named pressure fluid means and said skin for distributing the pressure exerted by said first named pressure fluid means to prevent pressing of the skin into the groove.

7. A device for fabricating an assembly of molded wood and the like material, comprising, a rigid die having spaced forming surfaces against which structure may be pressed, the space between said surfaces being adapted to contain material to be adhered to structure on the forming surfaces; a pressure fluid responsive member in the space between said surfaces, said member having a movable wall for engaging the material contained therein and to exert pressure directed to and through the material against the structure on the forming surfaces; means for urging said structure against said forming surfaces; and means for applying fluid under pressure to said member.

JOHN YOUNG.

REFERENCES CITED

The following references are of record in the file of this patent:

UNITED STATES PATENTS

| Number | Name | Date |
| --- | --- | --- |
| 2,168,280 | Klemm | Aug. 1, 1939 |
| 2,276,004 | Vidal et al. | Mar. 10, 1942 |
| 2,308,453 | Potchen et al. | Jan. 12, 1943 |
| 2,312,333 | Gramelspacher | Mar. 2, 1943 |
| 1,658,008 | Raiche | Jan. 31, 1928 |

OTHER REFERENCES

Automotive & Aviation Industries, page 29, June 1, 1943.